Patented Nov. 24, 1931

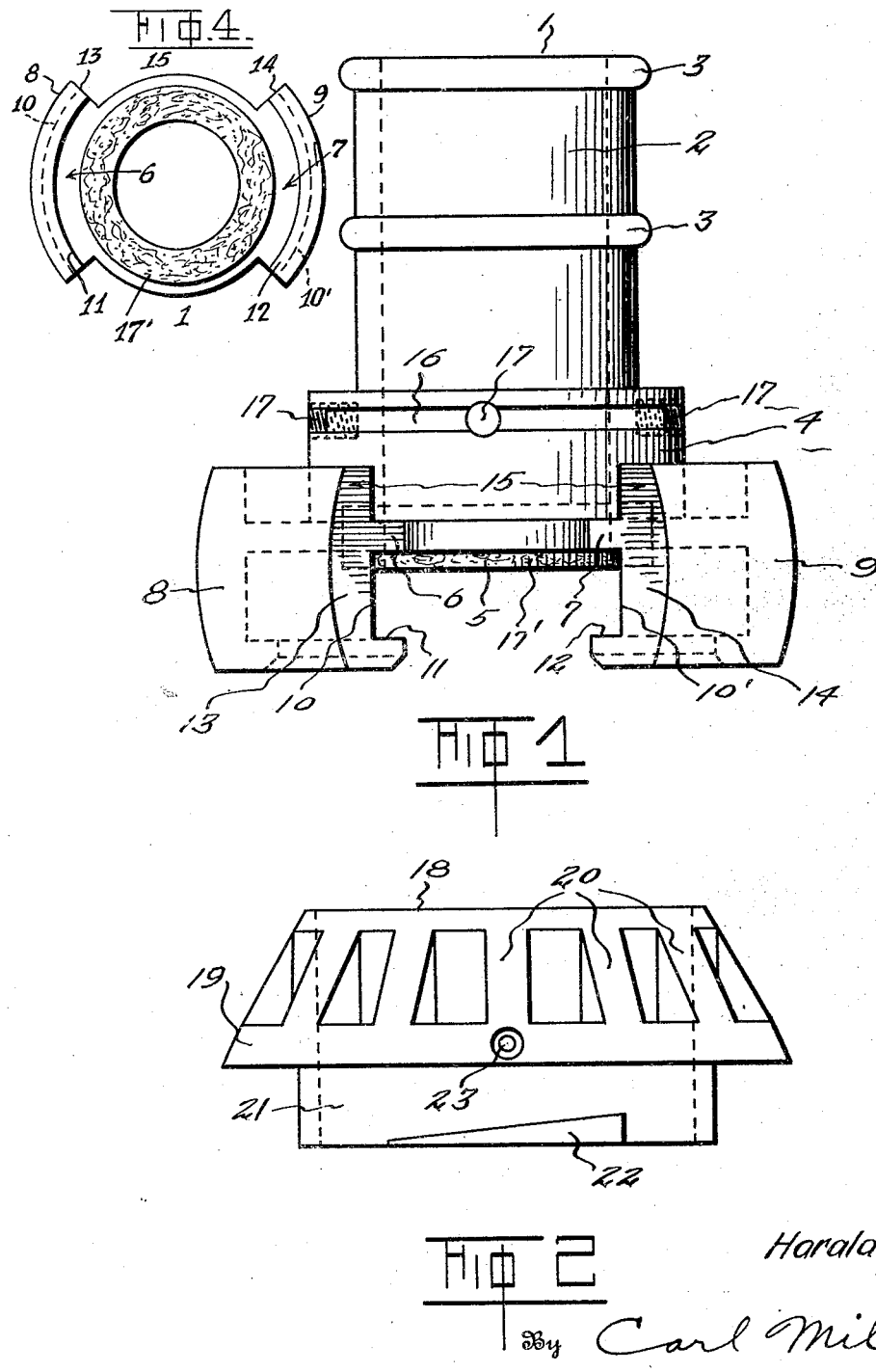

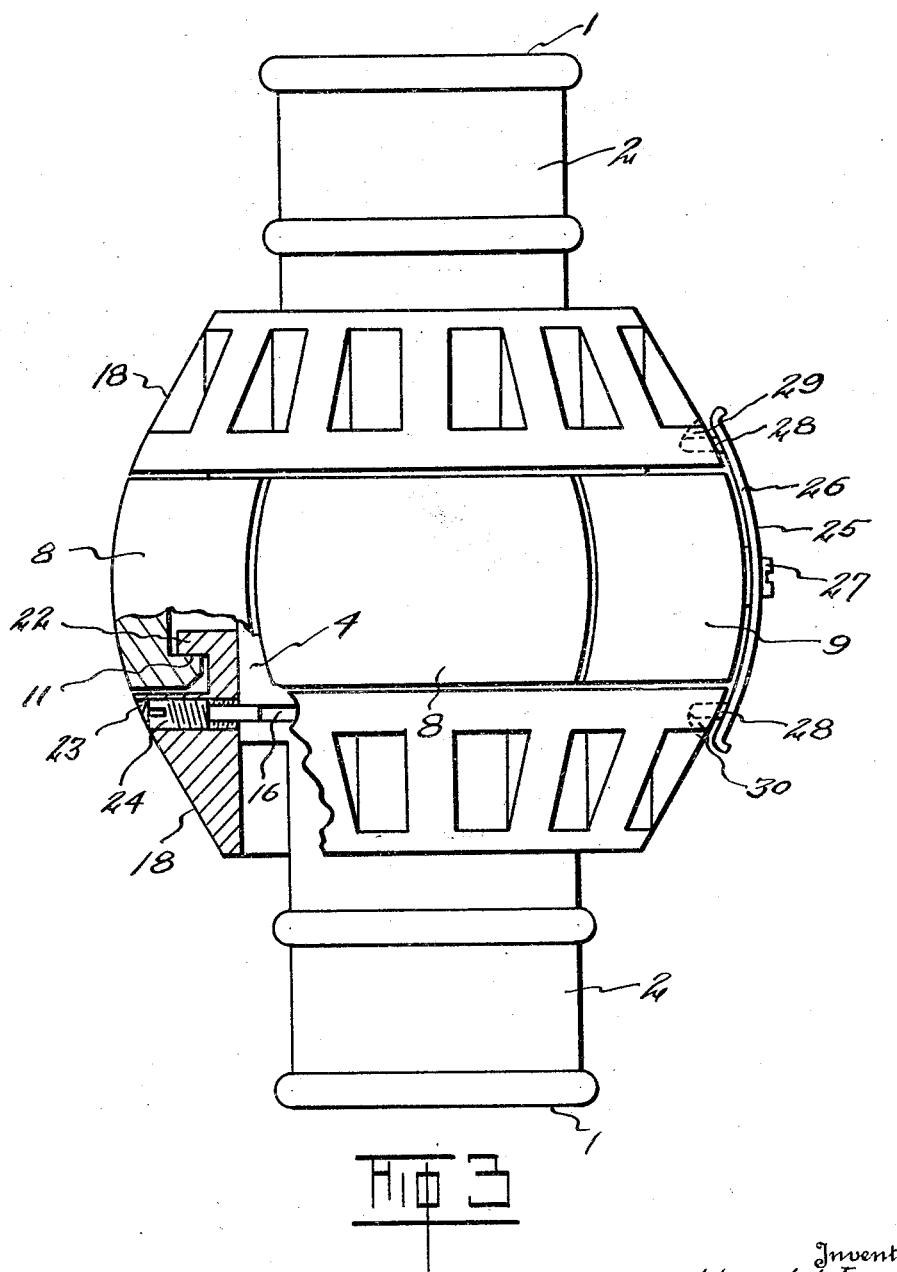

1,832,990

UNITED STATES PATENT OFFICE

HARALD LANGE, OF PORTLAND, OREGON

HOSE COUPLING

Application filed September 28, 1929. Serial No. 395,920.

This invention relates to hose couplings and more particularly to couplings adapted for use on heavy duty high pressure hose, as for example those used in modern fire fighting apparatus, pumps, as well as for use in gasoline oil pumps at service stations and elsewhere, oil trucks, and also in connection with marine pipe lines, etc.

The object of this invention is to provide a coupling that is easy to attach to the respective hose parts, easy to connect together and to disconnect, simple in design, exceedingly rugged and durable, and cheap to manufacture. Other objects of this invention will become apparent as the description thereof given hereunder proceeds, reference being now had to the accompanying drawings, wherein:—

Figure 1 is an elevational view of the coupling body.

Figure 2 is an elevational view of the coupling locking means.

Figure 3 is an elevational view partly in section of the coupling in assembled and locked position, and Fig. 4 is a front elevation of the structure of Fig. 1, upon a reduced scale.

The coupling as contemplated comprises two identical units, each unit comprising a coupling body (Figure 1) and a coupling locking element (Figure 2). The coupling body 1 is provided with a cylindrical extension 2 having beads 3 thereon, said extension being adapted to be inserted within a hose and retained therein by means of suitable clamps around said hose (not shown). The lower portion of the extension 2 merges integrally with a cylindrical portion 4 of increased diameter. Integral with the cylindrical portion 4 and flush with the bottom edge 5 thereof are transverse segmental shoulders 6 and 7 which in turn have integrally formed therewith segmental flanges 8 and 9, the inner surface 10 and 10' thereof being concentric with the surface of the cylindrical portion 4. Each of the flanges 8 and 9 is provided at the lower end thereof with an inwardly extending shoulder 11 and 12, respectively, the purpose of which is to be hereinafter described. As is apparent from Figure 1, the flanges 8 and 9 and segmental shoulders 6 and 7 are directly opposite each other, the faces 13 and 14 thereof being in vertical radial planes. The space 15 formed between the faces 13 and 14 is substantially equal in circumferential length to the circumferential length of the flange 8 or 9. In other words each flange and each space is substantially one-fourth of the circumference.

The cylindrical portion 4 is provided with a groove 16 adjacent its upper edge. Inserted in said groove 16 are four screw threaded plugs 17 disposed diametrically opposite each other, the purpose of which is to be hereinafter described. Inserted in the lower end of the cylindrical portion 4 in any conventional manner is a rubber washer 17'.

The coupling body 1 is provided with a coupling locking element 18 which is also cylindrical in form and of such a diameter as to fit over the cylindrical portion 4 of said coupling body 1. The locking element 18 is formed with an upper curved portion 19 provided with a plurality of vertical abutments 20, and a lower cylindrical extension 21 of reduced diameter as clearly shown in Figure 2. Integrally formed with said extension 21 at the lower end thereof and diametrically opposite each other are two projecting cams 22. Each of said cams is substantially one fourth of the circumferential length of said extension 21. A screw threaded opening 23 is provided adjacent the edge of the curved portion 19 directly centrally above each of the cams 22.

The coupling unit is assembled by sliding the coupling locking element 18 over the coupling body 1 so that the lower edge thereof rests on the segmental shoulders 6 and 7. Screws 24 are inserted in the screw threaded openings 23 so that the ends thereof slidably fit in the groove 16 whereby the locking element 18 is retained at all times on the coupling body 1. The screws 24 are adapted to slide in said groove between two of the plugs 17, which act as stops and as is apparent permitting the locking element to rotate a quarter turn.

As stated above, the coupling comprises two identical units which are clamped to the ends of hose sections (not shown). To connect the coupling units together, the flanges 8 and 9 of one are inserted in the spaces 15 formed between said flanges of the other. The locking elements on each of said units are turned so that the cams 22 engage the shoulders 11 and 12 on the flanges 8 and 9 in a sort of wedging action, thereby locking said units together, as clearly shown in Figure 3. By referring to Fig. 3 it will be seen that the configuration of the parts is such as to provide a heavy duty hose coupling of a generally bulbous shape. That is to say, the segmental flanges 8 and 9 are quite wide longitudinally of the coupling, and circumferentially are of such dimensions as to provide a substantially continuous wide ring which constitutes a riding surface upon which the coupling may be dragged along the ground.

The coupling locking elements 18 are in the form of relatively wide rings and their portions 19 have their inner edges disposed in such close relation to the edges of the segmental flanges 8 and 9 that small stones, gravel, and the like can not find lodgement between these parts. Further, the general contour of these rings is such that while they are of smaller diameter than the annular ring presented by the segmental flanges 8 and 9, their outer surfaces constitute substantial extensions of the surfaces presented by the flanges 8 and 9. In other words, the portions 19 of the coupling locking elements or rings begin substantially where the flanges 8 and 9 leave off, and they taper away from said flanges so that, as before stated, the whole assembly presents a bulbous structure with no openings or shoulders which would be likely to collect mud or snow or to catch in outside objects as the hose is dragged along the ground.

The importance of this in fire fighting operations is apparent. Couplings of this nature are particularly adapted for use by the Forest Service in fighting forest fires. The Forest Service uses many thousands of feet of hose with corresponding couplings. It is the practice to take water from mountain streams to feed the hose. During the fire fighting operations the hose must be dragged over all sorts of obstructions including twigs, small branches, through bushes, over telegraph and telephone lines which may be down, as a result of the fire, etc.

It is therefore of importance to provide a structure wherein the surfaces of the portions 19 of the coupling locking elements or locking rings 18 constitute substantial continuations of the surfaces of the flanges 8 and 9, and wherein the portions constituting the largest diameter of the said rings are substantially co-equal in diameter with the portions of the smallest diameter of the riding ring constituted by the segmental flanges 8 and 9, and wherein the confronting edges of the said portions 19 and the said segmental flanges 8 and 9 are reasonably close together to prevent the entry of twigs, branches, and the like, between them.

It will be observed that the structure recited defines an arrangement wherein the two sections of the hose coupling are identical, and consequently are interchangeable so that it is never necessary to turn a hose section end for end in order to match coupling sections, as is the case with hose couplings comprising male and female members.

To prevent said locking members 18 from moving and thereby disengaging said coupling units, a spring retaining means 25 is provided. Said spring retaining means 25 comprises a relatively stiff spring leaf 26 pivotally mounted at its center on a bolt 27 which secures the same to one of the flanges (9) of one coupling unit. A plug 28 is rigidly secured to each end of the spring 26 and is adapted to fit within suitable openings 29 and 30 provided in the locking members 18 when the same are in their locked position. When the spring 26 is in the position shown in Figure 3, the coupling units are absolutely prevented from disengaging, as is apparent.

While a preferred embodiment has been shown, it is to be understood that the same is susceptible of various modifications within the scope of the appended claims.

Having thus described my invention, what I claim as new and desire to secure by Letters Patent is:

1. A hose coupling comprising two identical and interchangeable units, each unit comprising a cylindrical hose engaging coupling body and offset segmental flanges carried thereby, the segmental flanges of one unit being adapted to enter between and substantially fill the spaces between the like flanges of the other unit, said flanges being quite wide longitudinally of the coupling to thereby present a wide longitudinally rounded central circumferential riding surface for the coupling, as a whole, inturned shoulders carried by the forward edges of the respective flanges, coupling locking elements mounted to turn with respect to said coupling body comprising cylindrical extensions of reduced diameter, and ring like portions of larger diameter, tapering cams carried by said cylindrical extensions adapted to engage behind and draw upon the rear faces of the inwardly extending shoulders of the segmental flanges of the opposed units; the contour of the ring like portions being such as to cause their outer surfaces to present substantially continuations of the longitudinally curved outer surfaces of the central riding member constituted by the segmental flanges, and the edges of said ring like portions being relatively close to the side edges of the said segmental flanges to thereby present a coupling of substantially bulbous formation, free of material external shoulders or recesses at the juncture of said flanges and said rings, said rings being, as a whole, of smaller diameter than the said segmental flanges complementally considered, and the said ring like portions tapering away from the said flanges.

2. A hose coupling comprising two identical and interchangeable units, each unit comprising a cylindrical hose engaging coupling body and offset segmental flanges carried thereby, the segmental flanges of one unit being adapted to enter between and substantially fill the spaces between the like flanges of the other unit, said flanges being quite wide longitudinally of the coupling to thereby present a wide longitudinally rounded central circumferential riding surface for the coupling, as a whole, inturned shoulders carried by the forward edges of the respective flanges, coupling locking elements mounted to turn with respect to and directly upon said coupling body comprising cylindrical extensions of reduced diameter, ring like portions of larger diameter, tapering cams carried by said cylindrical extensions adapted to engage behind and draw upon the rear faces of the inwardly extending shoulders of the segmental flanges of the opposed units; the contour of the ring like portions being such as to cause the outer surfaces to present substantial continuations of the longitudinally curved outer surfaces of the central riding member constituted by the segmental flanges and the edges of said ring like portions being relatively close to the side edges of the said segmental flanges to thereby present a coupling of substantially bulbous formation, free of material external shoulders or recesses at the juncture of said flanges and said rings, said rings being, as a whole, of smaller diameter than the said segmental flanges complementally considered, and the said ring like portions tapering away from the said flanges.

3. A hose coupling comprising two identical and interchangeable units, each unit comprising a cylindrical hose engaging coupling body and offset segmental flanges carried thereby, the segmental flanges of one unit being adapted to enter between and substantially fill the spaces between the like flanges of the other unit, said flanges being quite wide longitudinally of the coupling to thereby present a wide longitudinally rounded central circumferential riding surface for the coupling, as a whole, inturned shoulders carried by the forward edge of the respective flanges, coupling locking elements mounted to turn with respect to and directly upon said coupling body comprising cylindrical extensions of reduced diameter and ring like portions of larger diameter, tapering cams carried by said cylindrical extensions adapted to engage behind and draw upon the rear faces of the inwardly extending shoulders of the segmental flanges of the opposed units; the contour of the ring like portions being such as to cause the outer surfaces to present, substantially, continuations of the longitudinally curved outer surfaces of the central riding member constituted by the segmental flanges and the edges of said ring like portions being relatively close to the side edges of the said segmental flanges to thereby present a coupling of substantially bulbous formation, free of material external shoulders or recesses at the juncture of said flanges and said rings, said rings being, as a whole, of smaller diameter than the segmental flanges complementally considered, and the said ring like portions tapering away from the said flanges, said coupling body having a circumferential groove formed therein, and a member carried by the coupling locking element and engaging in said groove whereby the said coupling locking elements may be moved circumferentially but not longitudinally with respect to the coupling bodies upon which they are mounted.

4. A structure of the character described in claim 1 in combination with a locking means for locking the said coupling locking elements at their limits of movement in one direction.

5. A structure as recited in claim 1 in combination with a common locking element carried by one of said segmental flanges and engaging both of said coupling locking elements to lock said elements at their limit of movement in one direction.

In testimony whereof I affix my signature.

HARALD LANGE.